United States Patent
Lee et al.

(10) Patent No.: US 10,632,428 B2
(45) Date of Patent: Apr. 28, 2020

(54) WATER TREATMENT MEMBRANE PRODUCTION METHOD, WATER TREATMENT MEMBRANE PRODUCED USING SAME, AND WATER TREATMENT MODULE COMPRISING WATER TREATMENT MEMBRANE

(71) Applicant: LG CHEM, LTD., Seoul (KR)

(72) Inventors: Byoungsoo Lee, Daejeon (KR); Hyung Joon Jeon, Daejeon (KR); Hyelim Kang, Daejeon (KR); Chong Kyu Shin, Daejeon (KR); Bong Ju Kwak, Daejeon (KR)

(73) Assignee: LG CHEM, LTD., Seoul (KR)

( * ) Notice: Subject to any disclaimer, the term of this patent is extended or adjusted under 35 U.S.C. 154(b) by 206 days.

(21) Appl. No.: 15/580,656

(22) PCT Filed: May 9, 2016

(86) PCT No.: PCT/KR2016/004793
§ 371 (c)(1),
(2) Date: Dec. 7, 2017

(87) PCT Pub. No.: WO2017/039112
PCT Pub. Date: Mar. 9, 2017

(65) Prior Publication Data
US 2018/0178170 A1 Jun. 28, 2018

(30) Foreign Application Priority Data
Sep. 1, 2015 (KR) .................. 10-2015-0123699

(51) Int. Cl.
*B01D 71/56* (2006.01)
*B01D 71/06* (2006.01)
*C02F 1/44* (2006.01)
*B01D 61/02* (2006.01)
*B01D 69/10* (2006.01)
*B01D 67/00* (2006.01)
*B01D 63/00* (2006.01)
*B01D 69/12* (2006.01)

(52) U.S. Cl.
CPC ............. *B01D 71/56* (2013.01); *B01D 61/02* (2013.01); *B01D 61/025* (2013.01); *B01D 63/00* (2013.01);
(Continued)

(58) Field of Classification Search
CPC ..... C10M 71/25; C10M 67/006; B01D 71/06; B01D 71/56; B01D 61/02; B01D 61/025;
(Continued)

(56) References Cited

U.S. PATENT DOCUMENTS 6,878,278 B2 4/2005 Mickols
2003/0144461 A1 7/2003 Fujihara et al.
(Continued)

FOREIGN PATENT DOCUMENTS

EP 2448657 12/2018
JP 2004124038 4/2004
(Continued)

*Primary Examiner* — James C Goloboy
(74) *Attorney, Agent, or Firm* — Dentons US LLP

(57) ABSTRACT

The present specification relates to a method for manufacturing a water-treatment membrane, a water-treatment membrane manufactured using the same, and a water-treatment module including the water-treatment membrane.

12 Claims, 1 Drawing Sheet

(52) U.S. Cl.
CPC ......... *B01D 67/00* (2013.01); *B01D 67/0006* (2013.01); *B01D 69/10* (2013.01); *B01D 69/125* (2013.01); *B01D 71/06* (2013.01); *C02F 1/44* (2013.01); *C02F 1/441* (2013.01)

(58) Field of Classification Search
CPC ...... B01D 63/00; B01D 67/00; B01D 67/006; B01D 67/0006; B01D 69/10; B01D 69/125; C02F 1/44; C02F 1/441
See application file for complete search history.

(56) References Cited

U.S. PATENT DOCUMENTS

| | | |
|---|---|---|
| 2009/0159527 A1 | 6/2009 | Mickols et al. |
| 2009/0272692 A1 | 11/2009 | Kurth et al. |
| 2011/0005997 A1* | 1/2011 | Kurth .................... B01D 65/08 210/500.27 |
| 2012/0285890 A1* | 11/2012 | Koehler ............. B01D 67/0079 210/651 |
| 2015/0298066 A1 | 10/2015 | Roy et al. |

FOREIGN PATENT DOCUMENTS

| | | | |
|---|---|---|---|
| JP | 2011516264 | 5/2011 | |
| JP | 2012532015 | 12/2012 | |
| JP | 2013544646 | 12/2013 | |
| KR | 10-2011-0011626 | 2/2011 | |
| WO | 2009129354 | 10/2009 | |
| WO | 2010/120326 | 10/2010 | |
| WO | WO-2010120326 A1 * | 10/2010 | ........... B01D 61/002 |
| WO | 2014109947 | 7/2014 | |

\* cited by examiner

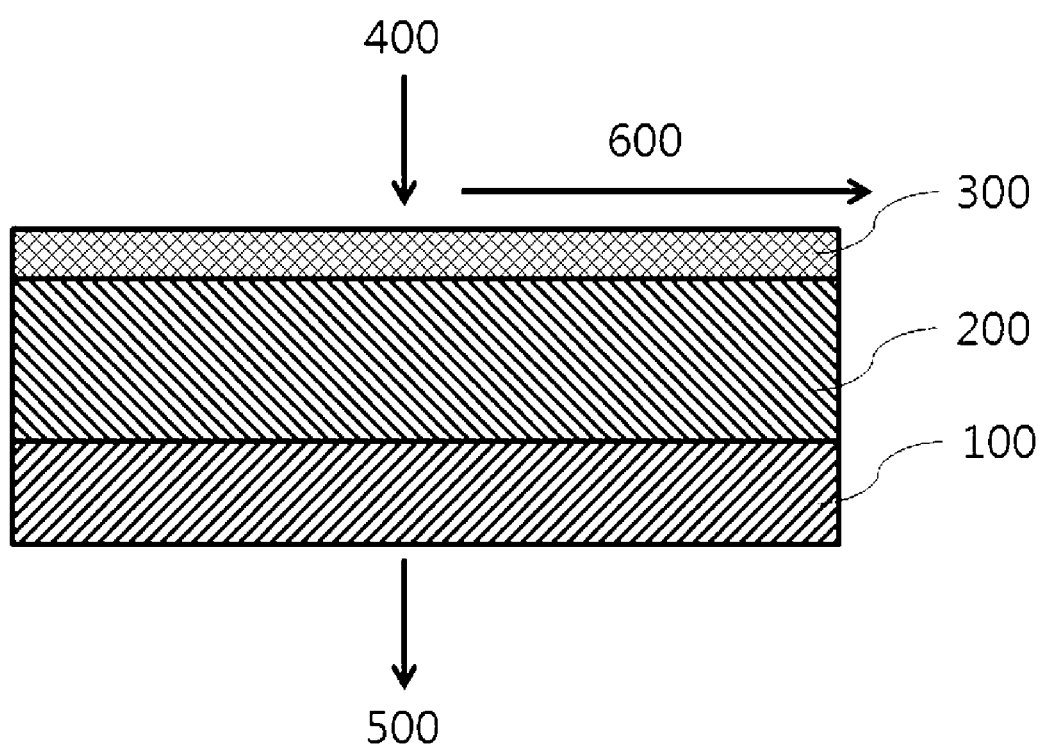

WATER TREATMENT MEMBRANE PRODUCTION METHOD, WATER TREATMENT MEMBRANE PRODUCED USING SAME, AND WATER TREATMENT MODULE COMPRISING WATER TREATMENT MEMBRANE

This application is a National Stage Application of International Application No. PCT/KR2016/004793 filed on May 9, 2016, which claims priority to and the benefits of Korean Patent Application No. 10-2015-0123699, filed with the Korean Intellectual Property Office on Sep. 1, 2015, both of which are incorporated herein in their entirety by reference for all purposes as if fully set forth herein.

TECHNICAL FIELD

The present specification claims priority to and the benefits of Korean Patent Application No. 10-2015-0123699, filed with the Korean Intellectual Property Office on Sep. 1, 2015, the entire contents of which are incorporated herein by reference.

The present specification relates to a method for manufacturing a water-treatment membrane, a water-treatment membrane manufactured using the same, and a water-treatment module including the water-treatment membrane.

Background Art

Between two solutions separated by a semipermeable membrane, the solvent moving from the solution with a low solute concentration to the solution with a high solute concentration by passing through the membrane is referred to as osmosis, and the pressure applied to the solution with a high solute concentration caused by the solvent migration is referred to as an osmotic pressure. However, when applying an external pressure higher than an osmotic pressure, the solvent migrates to the solution with a low solute concentration, and this phenomenon is referred to as reverse osmosis. Using a reverse osmosis principle and with a pressure gradient as a driving power, various salts or organic materials may be separated through a semipermeable membrane. A water-treatment membrane using such reverse osmosis separates molecular-level materials and removes salts from salt water or sea water, and is used to supply water for domestic use, construction, and industrial use.

Typical examples of such a water-treatment membrane may include a polyamide-based water-treatment membrane, and the polyamide-based water-treatment membrane is manufactured using a method of forming a polyamide active layer on a microporous layer support, and more specifically, is manufactured using a method of forming a microporous support by forming a polysulfone layer on a nonwoven fabric, forming a mPD layer by immersing this microporous support into an aqueous m-phenylenediamine (mPD) solution, and forming a polyamide layer through interfacial polymerization by immersing this again in a trimesoyl chloride (TMC) organic solvent to bring the mPD layer into contact with the TMC.

DISCLOSURE

Technical Problem

The present specification is directed to providing a water-treatment membrane having improved fouling resistance and a method for manufacturing the same.

Technical Solution

One embodiment of the present specification provides a method for manufacturing a water-treatment membrane including preparing a porous support; and forming a polyamide active layer on the porous support using interfacial polymerization of an aqueous solution including an amine compound and an organic solution including an acyl halide compound, wherein the organic solution further includes a compound represented by the following Chemical Formula 1.

[Chemical Formula 1]

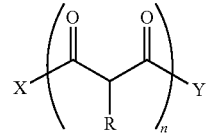

In Chemical Formula 1,

R is hydrogen; deuterium; a nitrile group; a halogen group; a substituted or unsubstituted alkyl group; a substituted or unsubstituted cycloalkyl group; a substituted or unsubstituted alkenyl group; a substituted or unsubstituted alkynyl group; a substituted or unsubstituted aryl group; or a substituted or unsubstituted heterocyclic group, X and Y are the same as or different from each other, and each independently a substituted or unsubstituted alkyl group; a substituted or unsubstituted cycloalkyl group; a substituted or unsubstituted alkenyl group; a substituted or unsubstituted alkynyl group; a substituted or unsubstituted aryl group; or a substituted or unsubstituted heterocyclic group, n is an integer of 1 to 10, and when n is 2 or greater, structures in the parentheses are the same as or different from each other.

Another embodiment of the present application provides a water-treatment membrane manufactured according to the method for manufacturing a water-treatment membrane described above, the water-treatment membrane including a porous support; and a polyamide active layer provided on the porous support, wherein the polyamide active layer includes the compound represented by Chemical Formula 1.

Advantageous Effects

According to one embodiment of the present specification, a water-treatment membrane including a compound represented by Chemical Formula 1 in a polyamide active layer has excellent salt rejection and/or flux properties.

DESCRIPTION OF DRAWINGS

FIG. 1 illustrates a water-treatment membrane according to one embodiment of the present specification.
<Reference Numeral>
100: Nonwoven Fabric
200: Porous Support
300: Polyamide Active Layer
400: Salt Water
500: Purified Water
600: Concentrated Water Mode for Disclosure In the present specification, a description of a certain member being placed "on" another member includes not only a case of the certain member adjoining the another member but a case of still another member being present between the two members.

In the present specification, a description of a certain part "including" certain constituents means capable of further including other constituents, and does not exclude other constituents unless particularly stated on the contrary.

In the present specification, examples of the substituents are described below, however, the substituents are not limited thereto.

In the present specification, the expression "substituted or unsubstituted" means being substituted with one or more substituents selected from the group consisting of deuterium; a halogen group; a nitrile group; an alkyl group; a cycloalkyl group; an alkenyl group; an aryl group; and a heterocyclic group, or being unsubstituted.

In one embodiment of the present specification, more preferably, the expression "substituted or unsubstituted" may mean being substituted with one or more substituents selected from the group consisting of deuterium; a halogen group; a nitrile group; an alkyl group having 1 to 10 carbon atoms; a cycloalkyl group having 3 to 10 carbon atoms; an alkenyl group having 2 to 10 carbon atoms; and an aryl group having 6 to 30 carbon atoms, or being unsubstituted.

In the present specification, examples of the halogen group may include fluorine, chlorine, bromine or iodine.

In the present specification, the alkyl group may be linear or branched, and although not particularly limited thereto, the number of carbon atoms is preferably from 1 to 40. According to one embodiment, the number of carbon atoms of the alkyl group is from 1 to 20. According to another embodiment, the number of carbon atoms of the alkyl group is from 1 to 10. According to another embodiment, the number of carbon atoms of the alkyl group is from 1 to 6. Specific examples of the alkyl group may include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl,isohexyl, 4-methylhexyl, 5-methylhexyl and the like, but are not limited thereto.

In the present specification, the cycloalkyl group is not particularly limited, but preferably has 3 to 60 carbon atoms, and according to one embodiment, the number of carbon atoms of the cycloalkyl group is from 3 to 30. According to another embodiment, the number of carbon atoms of the cycloalkyl group is from 3 to 20. According to another embodiment, the number of carbon atoms of the cycloalkyl group is from 3 to 6. Specific examples thereof may include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl and the like, but are not limited thereto.

In the present specification, the alkenyl group may be linear or branched, and although not particularly limited thereto, the number of carbon atoms is preferably from 2 to 40. According to one embodiment, the number of carbon atoms of the alkenyl group is from 2 to 20. According to another embodiment, the number of carbon atoms of the alkenyl group is from 2 to 10. According to another embodiment, the number of carbon atoms of the alkenyl group is from 2 to 6. Specific examples thereof may include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group and the like, but are not limited thereto.

In the present specification, the aryl group is not particularly limited but preferably has 6 to 60 carbon atoms, and may be a monocyclic aryl group or a multicyclic aryl group. According to one embodiment, the number of carbon atoms of the aryl group is from 6 to 30. According to one embodiment, the number of carbon atoms of the aryl group is from 6 to 20. Examples of the monocyclic aryl group may include a phenyl group, a biphenyl group, a terphenyl group and the like, but are not limited thereto. Examples of the multicyclic aryl group may include a naphthyl group, an anthracenyl group, a phenanthryl group, a pyrenyl group, a perylenyl group, a chrysenyl group, a fluorenyl group and the like, but are not limited thereto.

In the present specification, the heterocyclic group is a heterocyclic group including one or more of N, O, S, P, Si and Se as a heteroatom, and although not particularly limited thereto, the number of carbon atoms is preferably from 2 to 60. Examples of the heterocyclic group may include a thiophene group, a furan group, a pyrrole group, an imidazole group, a thiazole group, an oxazole group, an oxadiazole group, a triazole group, a pyridyl group, a bipyridyl group, a pyrimidyl group, a triazine group, an acridyl group, a pyridazine group, a pyrazinyl group, a quinolinyl group, a quinazoline group, a quinoxalinyl group, a phthalazinyl group, a pyridopyrimidinyl group, a pyridopyrazinyl group, a pyrazinopyrazinyl group, an isoquinoline group, an indole group, a carbazole group, a benzoxazole group, a benzimidazole group, a benzothiazole group, a benzocarbazole group, a benzothiophene group, a dibenzothiophene group, a benzofuranyl group, a phenanthroline group, a thiazolyl group, an isoxazolyl group, an oxadiazolyl group, a thiadiazolyl group, a benzothiazolyl group, a phenothiazinyl group, a dibenzofuranyl group and the like, but are not limited thereto.

Hereinafter, the present specification will be described in more detail.

One embodiment of the present specification provides a method for manufacturing a water-treatment membrane including preparing a porous support; and forming a polyamide active layer on the porous support using interfacial polymerization of an aqueous solution including an amine compound and an organic solution including an acyl halide compound, wherein the organic solution further includes a compound represented by the following Chemical Formula 1.

[Chemical Formula 1]

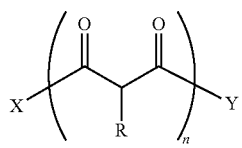

In Chemical Formula 1,

R is hydrogen; deuterium; a nitrile group; a halogen group; a substituted or unsubstituted alkyl group; a substituted or unsubstituted cycloalkyl group; a substituted or unsubstituted alkenyl group; a substituted or unsubstituted alkynyl group; a substituted or unsubstituted aryl group; or a substituted or unsubstituted heterocyclic group, X and Y are the same as or different from each other, and each independently a substituted or unsubstituted alkyl group; a substituted or unsubstituted cycloalkyl group; a substituted or unsubstituted alkenyl group; a substituted or unsubstituted alkynyl group; a substituted or unsubstituted aryl group; or a substituted or unsubstituted heterocyclic group, n is an integer of 1 to 10, and when n is 2 or greater, structures in the parentheses are the same as or different from each other.

The present disclosure aims to increase flux of a reverse osmosis membrane using an acetylacetone series additive when manufacturing a water-treatment membrane.

In other words, manufacturing of a water-treatment membrane in the art has aimed to enhance a flux property by varying m-phenylene diamine (mPD) and trimesoyl chloride (TMC) component proportions, however, an increase in the flux obtained by such variation of composition has limits in the effect.

In view of the above, for resolving such a problem and significantly increasing flux, the inventors of the present disclosure have invented a method of forming a polyamide active layer with an acetylacetone series additive included in an existing trimesoyl chloride (TMC) solution, and have identified that a water-treatment membrane manufactured using such a method exhibits an excellent flux property compared to when not using an acetylacetone series additive.

In addition, during a process of forming a polyamide active layer on the porous support using interfacial polymerization of an aqueous solution including an amine compound and an organic solution including an acyl halide compound, the present disclosure aims to enhance a flux property using an acetylacetone series additive in the organic solution including acyl halide, whereas existing water-treatment membranes aim to enhance flux by using an additive in the aqueous solution including an amine compound.

In addition, according to one embodiment of the present specification, an acetylacetone series additive may also be included in the aqueous solution including an amine compound as well as in the organic solution including acyl halide in order to enhance a flux property and/or a salt rejection property of a finally manufactured water-treatment membrane.

According to one embodiment of the present specification, X and Y are the same as or different from each other, and each independently an alkyl group unsubstituted or substituted with a halogen group; a cycloalkyl group unsubstituted or substituted with a halogen group; an alkenyl group unsubstituted or substituted with a halogen group; an aryl group unsubstituted or substituted with a halogen group; or a heterocyclic group unsubstituted or substituted with a halogen group.

According to one embodiment of the present specification, X and Y are the same as or different from each other, and each independently an alkyl group unsubstituted or substituted with a fluoro group; a cycloalkyl group unsubstituted or substituted with a fluoro group; an alkenyl group unsubstituted or substituted with a fluoro group; an aryl group unsubstituted or substituted with a fluoro group; or a heterocyclic group unsubstituted or substituted with a fluoro group.

According to one embodiment of the present specification, X or Y is an alkyl group having 1 to 10 carbon atoms unsubstituted or substituted with a halogen group.

According to one embodiment of the present specification, X or Y is an alkyl group having 1 to 10 carbon atoms unsubstituted or substituted with a fluoro group.

According to one embodiment of the present specification, X or Y is a methyl group unsubstituted or substituted with a fluoro group.

According to one embodiment of the present specification, X or Y is a substituted or unsubstituted aryl group having 6 to 30 carbon atoms.

According to one embodiment of the present specification, X or Y is a substituted or unsubstituted phenyl group.

According to one embodiment of the present specification, R is hydrogen; deuterium; a nitrile group; a halogen group; a substituted or unsubstituted alkyl group having 1 to 10 carbon atoms; a substituted or unsubstituted aryl group having 6 to 30 carbon atoms; or a substituted or unsubstituted heterocyclic group.

According to one embodiment of the present specification, R is hydrogen.

According to one embodiment of the present specification, R is a substituted or unsubstituted methyl group.

According to one embodiment of the present specification, R is a substituted or unsubstituted phenyl group.

According to one embodiment of the present specification, n is an integer of 1 to 5.

According to one embodiment of the present specification, n is an integer of 1 to 3.

According to one embodiment of the present specification, n is 1 or 2.

According to one embodiment of the present specification, n is 1.

According to one embodiment of the present specification, Chemical Formula 1 may be represented by any one of the following Compounds 1-1 to 1-7.

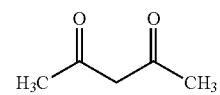

[Compound 1-1]

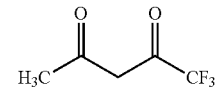

[Compound 1-2]

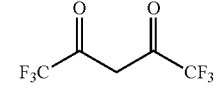

[Compound 1-3]

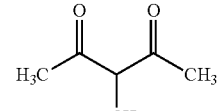

[Compound 1-4]

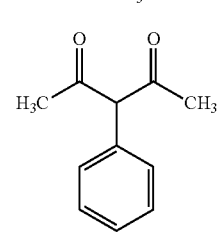

[Compound 1-5]

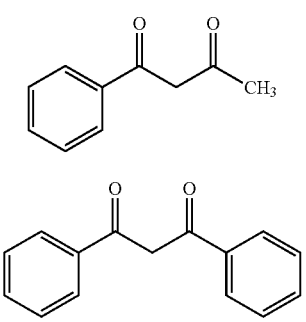

[Compound 1-6]

[Compound 1-7]

According to one embodiment of the present specification, the content of the compound represented by Chemical Formula 1 may be greater than or equal to 0.0001 parts by weight and less than or equal to 10 parts by weight with respect to 100 parts by weight of the organic solution.

In other words, according to one embodiment of the present specification, the content of the compound represented by Chemical Formula 1 being 0.001 parts by weight or greater with respect to 100 parts by weight of the organic solution is effective in preventing a phenomenon of reducing salt rejection and flux of a finally manufactured membrane, and the content being 10 parts by weight or less is effective in preventing a phenomenon of reducing salt rejection of a finally manufactured membrane.

In addition, according to one embodiment of the present specification, the content of the acyl halide compound may be greater than or equal to 0.1 parts by weight and less than or equal to 0.5 parts by weight with respect to 100 parts by weight of the organic solution.

In other words, according to one embodiment of the present specification, the content of the acyl halide compound being 0.1 parts by weight or greater with respect to 100 parts by weight of the organic solution is effective in preventing a phenomenon of reducing salt rejection and flux of a finally manufactured membrane, and the content being 0.5 parts by weight or less is effective in preventing a phenomenon of reducing salt rejection of a finally manufactured membrane.

In addition, according to one embodiment of the present specification, the organic solution may further include an organic solvent, and as the organic solvent, an aliphatic hydrocarbon solvent such as Freon, hexane, cyclohexane, heptane having 5 to 12 carbon atoms, a hydrophobic liquid that is not mixed with water such as alkane, for example, alkane having 5 to 12 carbon atoms, and IsoPar (Exxon), ISOL-C (SK Chem.) and ISOL-G (Exxon) that are mixture thereof, and the like, may be used, however, the organic solvent is not limited thereto.

According to one embodiment of the present specification, the organic solvent may be included in greater than or equal to 80 parts by weight and less than or equal to 99.499 parts by weight based on 100 parts by weight of the organic solution. The content of the organic solvent being 80 parts by weight or greater based on 100 parts by weight of the organic solution is effective in preventing a phenomenon of reducing salt rejection and flux of a finally manufactured membrane, and the content being 99.499 parts by weight or less is effective in preventing a phenomenon of reducing salt rejection of a finally manufactured membrane.

According to one embodiment of the present specification, the aqueous solution including an amine compound may further include the compound represented by Chemical Formula 1.

In addition, according to one embodiment of the present specification, the content of the compound represented by Chemical Formula 1 may be, with respect to 100 parts by weight of the aqueous solution including an amine compound, greater than or equal to 0.0001 parts by weight and less than or equal to 10 parts by weight, preferably greater than or equal to 0.1 parts by weight and less than or equal to 8 parts by weight, and more preferably greater than or equal to 0.5 parts by weight and less than or equal to 2 parts by weight.

According to one embodiment of the present specification, the water-treatment membrane may have a thickness of greater than or equal to 100 μm and less than or equal to 250 μm, and the water-treatment membrane having a thickness of 100 μm or greater is effective in preventing a phenomenon of reducing flux and salt rejection of a membrane, and the thickness being 250 μm or less is effective in preventing a phenomenon of reducing salt rejection of a membrane.

According to one embodiment of the present specification, the water-treatment membrane may have flux of 7 gfd or greater, preferably 15 gfd or greater, more preferably 18 gfd or greater, even more preferably 19 gfd or greater, and even more preferably 19.44 gfd or greater.

According to one embodiment of the present specification, the water-treatment membrane may have salt rejection of 90% or greater, preferably 95% or greater, more preferably 97% or greater, even more preferably 98% or greater, and even more preferably 98.88% or greater.

Another embodiment of the present specification provides a water-treatment membrane manufactured according to the method for manufacturing a water-treatment membrane described above, the water-treatment membrane including a porous support; and a polyamide active layer provided on the porous support, wherein the polyamide active layer includes the compound represented by Chemical Formula 1.

In the present specification, descriptions on Chemical Formula 1 are the same as the descriptions provided above.

According to one embodiment of the present specification, a structure derived from the compound represented by Chemical Formula 1 may be included inside or on the surface of the polyamide active layer.

According to one embodiment of the present specification, the structure derived from the compound represented by Chemical Formula 1 may mean a structure bonding to inside or the surface of the polyamide active layer while maintaining the structure of the compound represented by Chemical Formula 1. In addition, the structure derived from the compound represented by Chemical Formula 1 may mean a structure in which some functional groups of the compound represented by Chemical Formula 1 bonding to inside or the surface of the polyamide active layer through substitution.

According to one embodiment of the present specification, the compound represented by Chemical Formula 1 may have a form bonding to a polymer matrix of the polyamide active layer, or a form dispersed into a polymer matrix of the polyamide active layer.

The polymer matrix may mean a network structure of the polyamide polymer.

Specifically, according to one embodiment of the present specification, the compound represented by Chemical Formula 1 may be added during the polyamide active layer formation through interfacial polymerization, and bond to the polyamide polymer through crosslinking.

In addition, the compound represented by Chemical Formula 1 may physically bind to the empty space inside the polymer matrix of the polyamide active layer. Furthermore, the compound represented by Chemical Formula 1 may be placed in the empty space inside the polymer matrix of the polyamide active layer, and may be fixed through intermolecular attraction with the polymer matrix chain.

According to one embodiment of the present specification, the content of the compound represented by Chemical Formula 1 may be greater than or equal to 0.00001% by weight and less than or equal to 10% by weight with respect to the polyamide active layer.

In other words, according to one embodiment of the present specification, the content of the compound represented by Chemical Formula 1 being 0.00001% by weight or greater with respect to the polyamide active layer is effective in preventing a phenomenon of reducing flux and salt rejection of a finally manufactured membrane, and the content being 10% by weight or less is effective in preventing a phenomenon of reducing flux of a finally manufactured water-treatment membrane.

FIG. 1 illustrates a water-treatment membrane according to one embodiment of the present specification. Specifically, FIG. 1 illustrates a water-treatment membrane consecutively provided with a nonwoven fabric (100), a porous support (200) and a polyamide active layer (300). Salt water (400) flowed into the polyamide active layer (300), and purified water (500) is discharged through the nonwoven fabric (100) and concentrated water (600) is discharged outside not being able to pass through the polyamide active layer (300). However, the water-treatment membrane according to one embodiment of the present specification is not limited to the structure of FIG. 1, and additional constitutions may be further included.

According to one embodiment of the present specification, as the porous support, those forming a coating layer made of polymer materials on a nonwoven fabric may be used. Examples of the polymer material may include polysulfone, polyether sulfone, polycarbonate, polyethylene oxide, polyimide, polyether imide, polyetheretherketone, polypropylene, polymethylpentene, polymethyl chloride and polyvinylidene fluoride and the like, but are not limited thereto. Specifically, polysulfone may be used as the polymer material.

According to one embodiment of the present specification, the porous support may have a thickness of 60 μm to 100 μm, but is not limited thereto, and may be adjusted as necessary. In addition, the porous support preferably has pore sizes of 1 nm to 500 nm, however, the pore size is not limited thereto.

According to one embodiment of the present specification, the polyamide active layer may be formed through steps of forming an aqueous solution layer including an amine compound on a porous support; and forming a polyamide active layer by bringing an organic solution including an acyl halide compound and the compound represented by Chemical Formula 1 described above into contact with the aqueous solution layer including an amine compound thereon.

According to one embodiment of the present specification, when the aqueous solution layer including an amine compound and the organic solution including an acyl halide compound are brought into contact with other, the amine compound coated on the surface and the acyl halide compound produce polyamide through interfacial polymerization while reacting, and are adsorbed to a microporous support to form a thin film. In addition, according to one embodiment of the present specification, the contact may form the active layer through methods such as immersion, spray or coating.

According to one embodiment of the present specification, the method of forming an aqueous solution layer including an amine compound on the porous support is not particularly limited, and methods capable forming an aqueous solution layer on a support may be used without limit. Specifically, the method of forming an aqueous solution layer including an amine compound on the porous support may include spraying, coating, immersion, dropping and the like.

According to one embodiment of the present specification, the aqueous solution layer may further go through a step of removing an excess aqueous solution including an amine compound as necessary. The aqueous solution layer formed on the porous support may be non-uniformly distributed when the aqueous solution present on the support is too much, and when the aqueous solution is non-uniformly distributed, a non-uniform active layer may be formed thereafter by interfacial polymerization. Accordingly, an excess aqueous solution is preferably removed after forming an aqueous solution layer on the support. The excess aqueous solution removal is not particularly limited, and, for example, a sponge, an air knife, nitrogen gas blowing, natural drying, a press roll or the like may be used for the removal.

According to one embodiment of the present specification, in the aqueous solution including an amine compound, the amine compound is not particularly limited in the type as long as it is an amine compound used for manufacturing a water-treatment membrane, and specific examples thereof may preferably include m-phenylenediamine, p-phenylenediamine, 1,3,6-benzenetriamine, 4-chloro-1,3-phenylenediamine, 6-chloro-1,3-phenylenediamine, 3-chloro-1,4-phenylenediamine or mixtures thereof.

According to one embodiment of the present specification, examples of the acyl halide compound may, although not particularly limited thereto, include one or more types of mixtures selected from the group consisting of trimesoyl chloride, isophthaloyl chloride and terephthaloyl chloride as an aromatic compound having 2 to 3 carboxylic acid halides.

According to one embodiment of the present specification, the water-treatment membrane may be used as a micro filtration membrane, an ultrafiltration membrane, a nanofiltration membrane, a reverse osmosis membrane or the like, and specifically, may be used as a reverse osmosis membrane.

One embodiment of the present disclosure provides a water-treatment module including at least one or more of the water-treatment membranes described above.

In one embodiment of the present disclosure, specific types of the water-treatment module are not particularly limited, and examples thereof may include a plate & frame module, a tubular module, a hollow & fiber module, a spiral wound module or the like. In addition, as long as the water-treatment module includes the water-treatment membrane according to one embodiment of the present disclosure described above, the water-treatment module is not particularly limited in other constitutions and manufacturing methods, and general means known in the art may be employed without limit.

Meanwhile, the water-treatment module according to one embodiment of the present specification has excellent salt rejection and flux, and has excellent chemical stability, and therefore, is useful in water-treatment systems such as household/industrial water-purification systems, sewage treatment systems or sea to fresh water treatment systems.

Hereinafter, the present specification will be described in detail with reference to examples in order to specifically describe the present specification. However, examples according to the present specification may be modified to various different forms, and the scope of the present specification is not construed as being limited to the examples described below. The examples of the present specification are provided in order to more fully describe the present specification to those having average knowledge in the art.

Manufacture of Water-Treatment Membrane

EXAMPLE 1

18% by weight of polysulfone solid was introduced to a N,N-dimethylformamide (DMF) solution and dissolved for 12 hours or longer at 80° C. to 85° C. to obtain a uniform liquid. This solution was casted to a thickness of 150 μm on a nonwoven fabric made of polyester material and having a thickness of 95 μm to 100 μm. Then, the casted nonwoven fabric was placed in water to prepare a porous polysulfone support.

The porous polysulfone support prepared as above was coated with an aqueous solution including 2.475 wt % of metaphenylenediamine (mPD) to form an aqueous solution layer. An organic solution was prepared by adding 0.1 wt % of a 1,1,1-trifluoroacetylacetone (TFAA) solution to 0.226 wt % of a trimesoyl chloride (TMC) solution using an ISOPar (Exxon) solvent, and the organic solution was coated on the aqueous solution layer. The result was dried to form a polyamide active layer and as a result, a water-treatment membrane was manufactured.

EXAMPLE 2

A water-treatment membrane was manufactured in the same manner as in Example 1 except that the organic solution was prepared by adding 0.2 wt % of a 1,1,1-trifluoroacetylacetone (TFAA) solution to 0.226 wt % of a trimesoyl chloride (TMC) solution using an ISOPar (Exxon) solvent.

EXAMPLE 3

A water-treatment membrane was manufactured in the same manner as in Example 1 except that the organic solution was prepared by adding 0.4 wt % of a 1,1,1-trifluoroacetylacetone (TFAA) solution to 0.226 wt % of a trimesoyl chloride (TMC) solution using an ISOPar (Exxon) solvent.

EXAMPLE 4

A water-treatment membrane was manufactured in the same manner as in Example 1 except that the organic solution was prepared by adding 1.0 wt % of a 1,1,1-trifluoroacetylacetone (TFAA) solution to 0.226 wt % of a trimesoyl chloride (TMC) solution using an ISOPar (Exxon) solvent.

EXAMPLE 5

A water-treatment membrane was manufactured in the same manner as in Example 1 except that the organic solution was prepared by adding 5.0 wt % of a 1,1,1-trifluoroacetylacetone (TFAA) solution to 0.226 wt % of a trimesoyl chloride (TMC) solution using an ISOPar (Exxon) solvent.

EXAMPLE 6

A water-treatment membrane was manufactured in the same manner as in Example 1 except that the organic solution was prepared by adding 15.0 wt % of a 1,1,1-trifluoroacetylacetone (TFAA) solution to 0.226 wt % of a trimesoyl chloride (TMC) solution using an ISOPar (Exxon) solvent.

EXAMPLE 7

A water-treatment membrane was manufactured in the same manner as in Example 1 except that the aqueous solution was prepared by adding 0.5 wt % of a $Z^+B^-$ salt to 2.475 wt % of an aqueous metaphenylenediamine (mPD) solution using water as a solvent, and the organic solution was prepared by adding 0.1 wt % of a 1,1,1-trifluoroacetylacetone (TFAA) solution to 0.226 wt % of a trimesoyl chloride (TMC) solution using an ISOPar (Exxon) solvent.

The $Z^+B^-$ is a Trimethylammonium Hexafluoroacetylacetonate with $Z^+$ being an amine series compound and $B^-$ being a acetylacetonate compound such as hexafluoroacetylacetonate, and it is a material used only in the aqueous solution layer in a salt state.

EXAMPLE 8

A water-treatment membrane was manufactured in the same manner as in Example 1 except that the aqueous solution was prepared by adding 0.5 wt % of a $Z^+B^-$ salt to 2.475 wt % of an aqueous metaphenylenediamine (mPD) solution using water as a solvent, and the organic solution was prepared by adding 0.2 wt % of a 1,1,1-trifluoroacetylacetone (TFAA) solution to 0.226 wt % of a trimesoyl chloride (TMC) solution using an ISOPar (Exxon) solvent.

EXAMPLE 9

A water-treatment membrane was manufactured in the same manner as in Example 1 except that the aqueous solution was prepared by adding 1.0 wt % of a $Z^+B^-$ salt to 2.475 wt % of an aqueous metaphenylenediamine (mPD) solution using water as a solvent, and the organic solution was prepared by adding 0.2 wt % of a 1,1,1-trifluoroacetylacetone (TFAA) solution to 0.226 wt % of a trimesoyl chloride (TMC) solution using an ISOPar (Exxon) solvent.

EXAMPLE 10

A water-treatment membrane was manufactured in the same manner as in Example 1 except that the organic solution was prepared by adding 0.1 wt % of a 1,1,1,5,5,5-hexafluoroacetylacetone (HFAA) solution to 0.226 wt % of a trimesoyl chloride (TMC) solution using an ISOPar (Exxon) solvent.

EXAMPLE 11

A water-treatment membrane was manufactured in the same manner as in Example 1 except that the organic solution was prepared by adding 0.2 wt % of a 1,1,1,5,5,5-hexafluoroacetylacetone (HFAA) solution to 0.226 wt % of a trimesoyl chloride (TMC) solution using an ISOPar (Exxon) solvent.

EXAMPLE 12

A water-treatment membrane was manufactured in the same manner as in Example 1 except that the organic solution was prepared by adding 0.4 wt % of a 1,1,1,5,5,5- hexafluoroacetylacetone (HFAA) solution to 0.226 wt % of a trimesoyl chloride (TMC) solution using an ISOPar (Exxon) solvent.

EXAMPLE 13

A water-treatment membrane was manufactured in the same manner as in Example 1 except that the organic solution was prepared by adding 1.0 wt % of a 1,1,1,5,5,5-hexafluoroacetylacetone (HFAA) solution to 0.226 wt % of a trimesoyl chloride (TMC) solution using an ISOPar (Exxon) solvent.

COMPARATIVE EXAMPLE 1

A water-treatment membrane was manufactured in the same manner as in Example 1 except that the organic solution was prepared without adding a 1,1,1-trifluoroacetylacetone (TFAA) solution to 0.226 wt % of a trimesoyl chloride (TMC) solution using an ISOPar (Exxon) solvent.

COMPARATIVE EXAMPLE 2

A water-treatment membrane was manufactured in the same manner as in Example 1 except that the aqueous solution was prepared by adding 0.5 wt % of Trimethylammonium Hexafluoroacetylacetonate, which converts 1,1,1-trifluoroacetylacetone (TFAA) to a salt form, to 2.475 wt % of an aqueous metaphenylenediamine (mPD) solution using water as a solvent.

COMPARATIVE EXAMPLE 3

A water-treatment membrane was manufactured in the same manner as in Example 1 except that the aqueous solution was prepared by adding 1.0 wt % of Trimethylammonium Hexafluoroacetylacetonate, which converts 1,1,1-trifluoroacetylacetone (TFAA) to a salt form, to 2.475 wt % of an aqueous metaphenylenediamine (mPD) solution using water as a solvent.

COMPARATIVE EXAMPLE 4

A water-treatment membrane was manufactured in the same manner as in Example 1 except that the aqueous solution was prepared by adding 2.0 wt % of Trimethylammonium Hexafluoroacetylacetonate, which converts 1,1,1-trifluoroacetylacetone (TFAA) to a salt form, to 2.475 wt % of an aqueous metaphenylenediamine (mPD) solution using water as a solvent.

EXPERIMENTAL EXAMPLE

Performance Evaluation on Water-Treatment Membrane

Initial salt rejection and initial flux of the water-treatment membranes manufactured according to Examples 1 to 13 and Comparative Examples 1 to 4 were evaluated as follows.

In order to measure salt rejection and flux (gfd) of the water-treatment membranes manufactured according to Example 1 to Example 6 and Comparative Example 1, a water-treatment module formed including a flat permeable cell, a high pressure pump, a storage tank and a cooling device was used. The structure of the flat permeable cell is a cross-flow type and the effective permeation area was 28 cm$^2$. After installing a reverse osmosis membrane on the permeable cell, a preliminary operation was sufficiently performed for approximately 1 hour using deionized water for evaluation device stabilization. After that, device stabilization was confirmed through device operation for approximately 1 hour using a 250 ppm aqueous sodium chloride solution with 60 psi and 4.5 L/min flux, and flux was calculated by measuring the amount of water permeated for 10 minutes at 25° C., and salt rejection was calculated by analyzing the salt concentration before and after the permeation using a conductivity meter.

Salt rejection and flux of the water-treatment membranes manufactured according to Example 1 to Example 6 and Comparative Example 1 described above were evaluated, and the measurement results are shown in the following Table 1.

TABLE 1

| Category | TFAA (wt %) in Organic Solution | Salt Rejection (%) | Flux (gfd) |
| --- | --- | --- | --- |
| Comparative Example 1 | — | 98.06 | 8.49 |
| Example 1 | 0.1 | 98.88 | 15.31 |
| Example 2 | 0.2 | 98.75 | 17.67 |
| Example 3 | 0.4 | 97.85 | 19.44 |
| Example 4 | 1.0 | 97.51 | 19.67 |
| Example 5 | 5.0 | 97.03 | 19.09 |
| Example 6 | 15.0 | 90.53 | 13.76 |

*TFAA: 1,1,1-trifluoroacetylacetone

As shown in Table 1, it was identified that a higher flux property was obtained when using the acetylacetone series additive in the trimesoyl chloride (TMC) solution used when preparing the polyamide active layer (Examples 1 to 6) compared to when the additive was not used (Comparative Example 1), and in addition thereto, it was identified that the corresponding additive was not able to be used in the aqueous solution composition due to a solubility problem.

In addition, salt rejection and flux of the water-treatment membranes manufactured according to Comparative Examples 1 to 4 described above were evaluated, and the measurement results are shown in the following Table 2.

TABLE 2

| Category | Trimethylammonium Hexafluoroacetylacetonate (wt %) in Aqueous Solution | Salt Rejection (%) | Flux (gfd) |
| --- | --- | --- | --- |
| Comparative Example 1 | — | 98.06 | 8.49 |
| Comparative Example 2 | 0.5 | 98.37 | 10.98 |
| Comparative Example 3 | 1.0 | 98.25 | 14.44 |
| Comparative Example 4 | 2.0 | 98.01 | 13.84 |

As shown in Table 2, it was identified that a higher flux property was obtained when using the additive of a salt form of 1,1,1-trifluoroacetylacetone in the aqueous solution including 2.475 wt % of metaphenylenediamine (mPD) used when preparing the polyamide active layer (Comparative Examples 2 to 4) compared to when the additive was not used (Comparative Example 1). However, when comparing with Table 1, results of smaller performance improvement were identified compared to when using the acetylacetone series additive in the trimesoyl chloride (TMC) solution. In addition thereto, it was identified that the corresponding additive was not able to be used in the aqueous solution composition due to a solubility problem.

In addition, salt rejection and flux of the water-treatment membranes manufactured according to Examples 7 to 9 and Comparative Example 1 described above were evaluated, and the measurement results are shown in the following Table 3.

TABLE 3

| Category | Trimethylammonium Hexafluoroacetylacetonate (wt %) in Aqueous Solution | TFAA (wt %) in Organic Solution | Salt Rejection (%) | Flux (gfd) |
| --- | --- | --- | --- | --- |
| Comparative Example 1 | — | — | 98.06 | 8.49 |
| Example 7 | 0.5 | 0.1 | 99.22 | 11.91 |
| Example 8 | 1.0 | 0.2 | 97.75 | 14.74 |
| Example 9 | 2.0 | 0.2 | 98.07 | 13.88 |

As shown in Table 3, it was identified that a higher flux property was obtained when using the additive of a salt form of 1,1,1-trifluoroacetylacetone in the aqueous solution including 2.475 wt % of metaphenylenediamine (mPD) used when preparing the polyamide active layer and using the acetylacetone series additive in the trimesoyl chloride (TMC) solution at the same time (Examples 7 to 9) compared to when the additives were not used (Comparative Example 1).

However, when comparing with Table 1 and Table 2, results of smaller performance improvement were identified compared to when separately using the additives in each of the compositions.

TABLE 4

| Category | HFAA (wt %) in Organic Solution | Salt Rejection (%) | Flux (gfd) |
| --- | --- | --- | --- |
| Comparative Example 1 | — | 98.06 | 8.49 |
| Example 10 | 0.1 | 98.37 | 10.13 |
| Example 11 | 0.2 | 98.32 | 12.48 |
| Example 12 | 0.4 | 98.21 | 13.94 |
| Example 13 | 1.0 | 97.95 | 15.38 |

As shown in Table 4, it was identified that a higher flux property was obtained when using the 1,1,1,5,5,5-Hexafluoroacetylacetone (HFAA) additive in the trimesoyl chloride (TMC) solution used when preparing the polyamide active layer (Examples 10 to 13) compared to when the additive was not used (Comparative Example 1), and in addition thereto, it was identified that the corresponding additive was not able to be used in the aqueous solution composition due to a solubility problem.

However, when comparing with Table 1, results of smaller performance improvement were identified compared to when using the 1,1,1-Trifluoroacetylacetone (TFAA) additive in the trimesoyl chloride (TMC) solution.

Hereinbefore, preferred examples of the present disclosure have been described, however, the present disclosure is not limited thereto, and various modifications may be made within the scope of claims and detailed descriptions of the disclosure, and these also belong to the scope of the present disclosure.

The invention claimed is:

1. A method for manufacturing a water-treatment membrane comprising:
    preparing a porous support; and
    forming a polyamide active layer on the porous support using interfacial polymerization of an aqueous solution including an amine compound and an organic solution including an acyl halide compound, wherein:
    the organic solution further includes a compound of Chemical Formula 1:

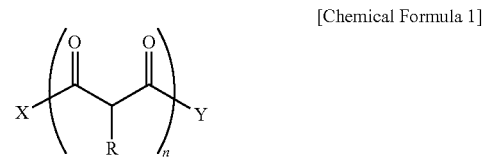

[Chemical Formula 1]

wherein:
    R is hydrogen, deuterium, a nitrile group, a halogen group, a substituted or unsubstituted alkyl group, a substituted or unsubstituted cycloalkyl group, a substituted or unsubstituted alkenyl group, a substituted or unsubstituted alkynyl group, a substituted or unsubstituted aryl group, or a substituted or unsubstituted heterocyclic group;

X and Y are the same as or different from each other, and each independently is a substituted or unsubstituted alkyl group, a substituted or unsubstituted cycloalkyl group, a substituted or unsubstituted alkenyl group, a substituted or unsubstituted alkynyl group, a substituted or unsubstituted aryl group, or a substituted or unsubstituted heterocyclic group; and n is an integer of 1 to 10, and when n is 2 or greater, structures in the parentheses are the same as or different from each other; and an amount of Chemical Formula 1 present in the organic solution is greater than or equal to 0.0001 parts by weight and less than or equal to 10 parts by weight with respect to 100 parts by weight of the organic solution.

2. The method for manufacturing a water-treatment membrane of claim 1, wherein X and Y are the same as or different from each other, and each independently is an alkyl group unsubstituted or substituted with a halogen group, a cycloalkyl group unsubstituted or substituted with a halogen group, an alkenyl group unsubstituted or substituted with a halogen group, an aryl group unsubstituted or substituted with a halogen group, or a heterocyclic group unsubstituted or substituted with a halogen group.

3. The method for manufacturing a water-treatment membrane of claim 1, wherein X and Y are the same as or different from each other, and each independently an alkyl group unsubstituted or substituted with a fluoro group, a cycloalkyl group unsubstituted or substituted with a fluoro group, an alkenyl group unsubstituted or substituted with a fluoro group, an aryl group unsubstituted or substituted with a fluoro group, or a heterocyclic group unsubstituted or substituted with a fluoro group.

4. The method for manufacturing a water-treatment membrane of claim 1, wherein X and Y are an alkyl group having 1 to 10 carbon atoms unsubstituted or substituted with a halogen group.

5. The method for manufacturing a water-treatment membrane of claim 1, wherein R is hydrogen.

6. The method for manufacturing a water-treatment membrane of claim 1, wherein n is an integer of 1 to 3.

7. The method for manufacturing a water-treatment membrane of claim 1, wherein Chemical Formula 1 is any one of the following Compounds 1-1 to 1-7:

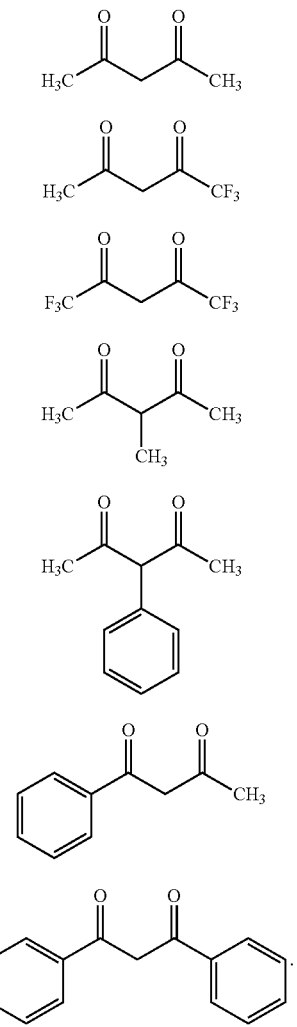

8. The method for manufacturing a water-treatment membrane of claim 1, wherein the aqueous solution including an amine compound further includes the compound of Chemical Formula 1.

9. The method for manufacturing a water-treatment membrane of claim 8, wherein an amount of the compound of Chemical Formula 1 is greater than or equal to 0.0001 parts by weight and less than or equal to 10 parts by weight with respect to 100 parts by weight of the aqueous solution containing an amine compound.

10. A water-treatment membrane manufactured using the method of claim 1, the water-treatment membrane comprising:
a porous support; and
a polyamide active layer provided on the porous support, wherein the polyamide active layer includes a compound of Chemical Formula 1:

[Chemical Formula 1]

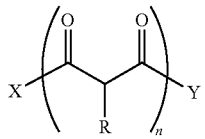

wherein:
R is hydrogen, deuterium, a nitrile group, a halogen group, a substituted or unsubstituted alkyl group, a substituted or unsubstituted cycloalkyl group a substituted or unsubstituted alkenyl group, a substituted or unsubstituted alkynyl group, a substituted or unsubstituted aryl group, or a substituted or unsubstituted heterocyclic group;
X and Y are the same as or different from each other, and each independently a substituted or unsubstituted alkyl group, a substituted or unsubstituted cycloalkyl group, a substituted or unsubstituted alkenyl group, a substituted or unsubstituted alkynyl group, a substituted or unsubstituted aryl group, or a substituted or unsubstituted heterocyclic group; and
n is an integer of 1 to 10, and when n is 2 or greater, structures in the parentheses are the same as or different from each other.

11. The water-treatment membrane of claim 10, wherein an amount of the compound of Chemical Formula 1 is greater than or equal to 0.00001% by weight and less than or equal to 10% by weight with respect to the polyamide active layer.

12. A water-treatment module comprising the water-treatment membrane of claim 10.

* * * * *